(No Model.) 2 Sheets—Sheet 1.
W. RENSHAW & N. W. THILLMAN.
PUNCHING, SHEARING, AND EMBOSSING MACHINE.
No. 353,589. Patented Nov. 30, 1886.
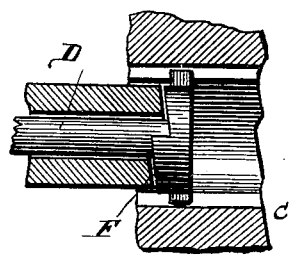
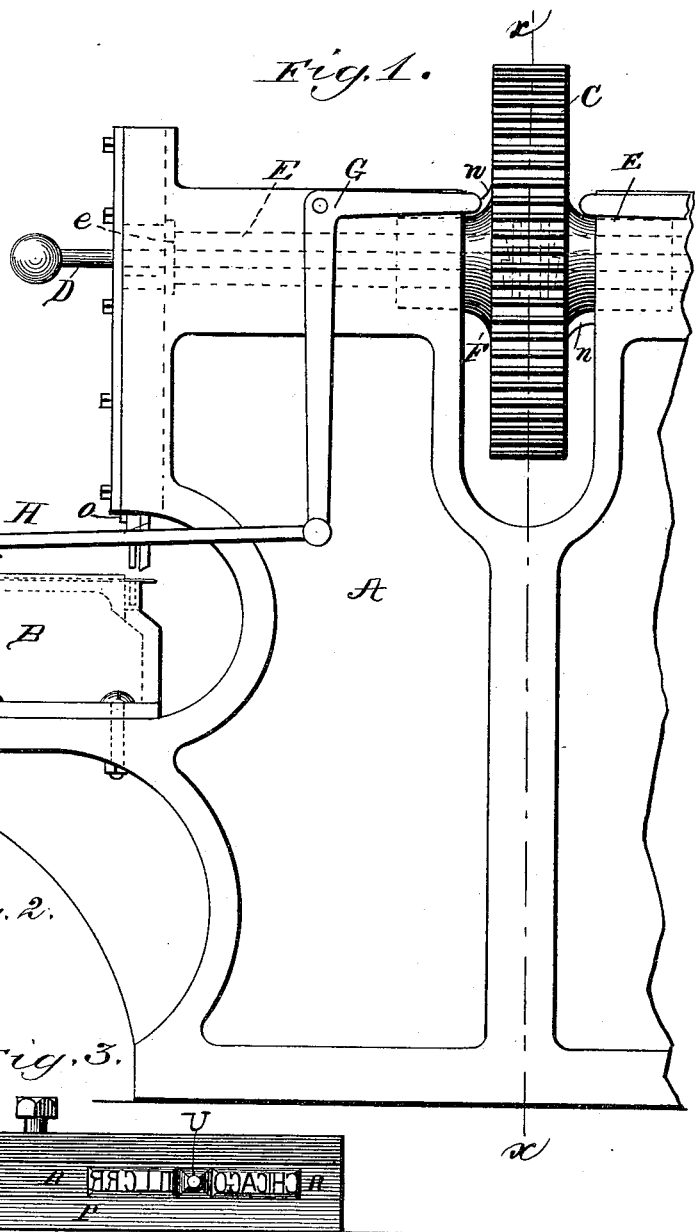
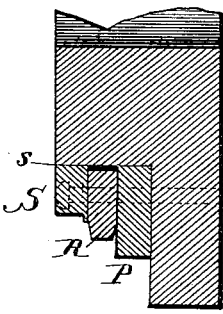
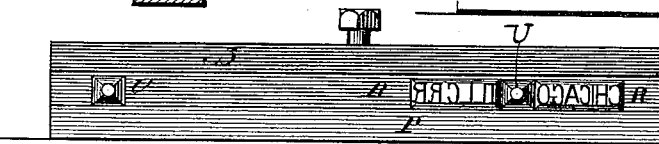
Witnesses
W. Rossiter
J. I. Veeder
Inventors
William Renshaw
N. W. Thillman
By Raymond & Rainey
Attys.

(No Model.) 2 Sheets—Sheet 2.

W. RENSHAW & N. W. THILLMAN.
PUNCHING, SHEARING, AND EMBOSSING MACHINE.

No. 353,589. Patented Nov. 30, 1886.

Witnesses,
W. Rossiter
J. I. Veeder

Inventors
William Renshaw
N. W. Thillman
By Raymond & Ranney
Attys

UNITED STATES PATENT OFFICE.

WILLIAM RENSHAW AND NICHOLAS W. THILLMAN, OF CHICAGO, ILLINOIS.

PUNCHING, SHEARING, AND EMBOSSING MACHINE.

SPECIFICATION forming part of Letters Patent No. 353,589, dated November 30, 1886.

Application filed September 6, 1886. Serial No. 212,859. (No model.)

*To all whom it may concern:*

Be it known that we, WILLIAM RENSHAW and NICHOLAS W. THILLMAN, both of Chicago, in the county of Cook and State of Illinois, have invented certain new and useful Improvements in Punching, Embossing, and Shearing Machines, of which the following is a full, clear, and exact description.

Our invention has for its special object the rapid and economical production of car and other seals made of strips of sheet metal, whether the seals be plain or stamped and punched.

Our invention consists in the combination, with punches, shear-blades, and dies, of appropriate means of operating the same, and feeding mechanism for feeding the plates from which the seals are made.

Figure 5:
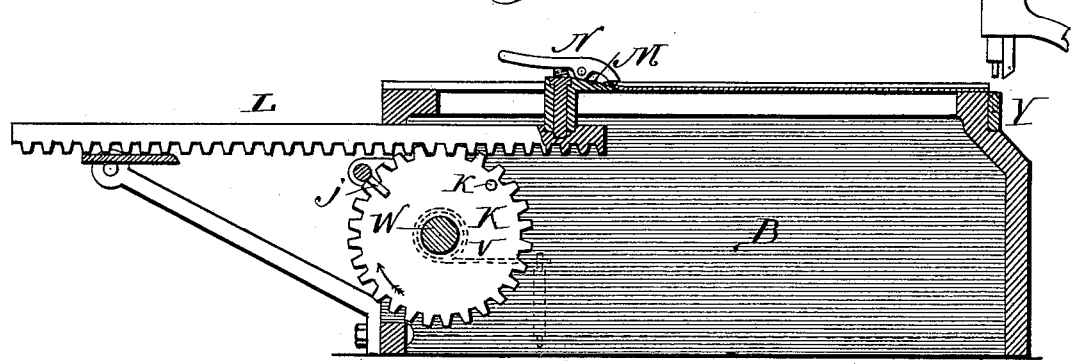
Figure 6:
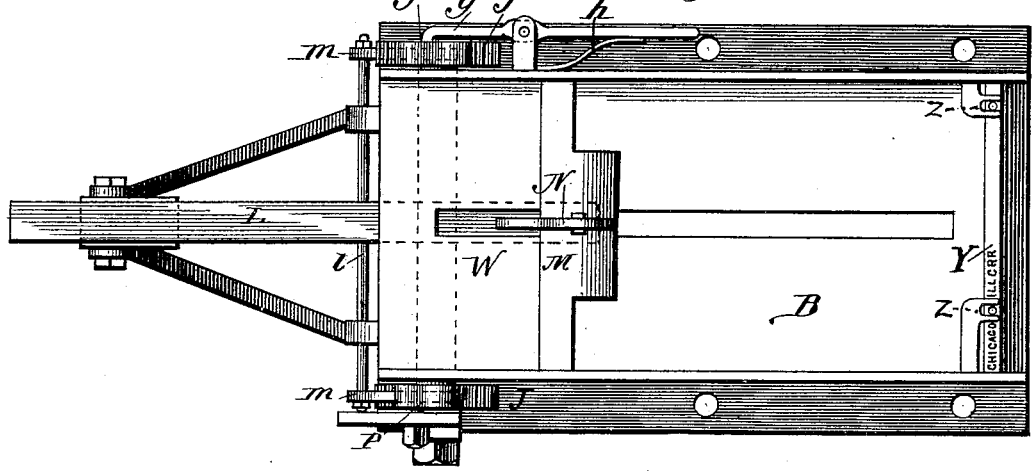
Figure 7:
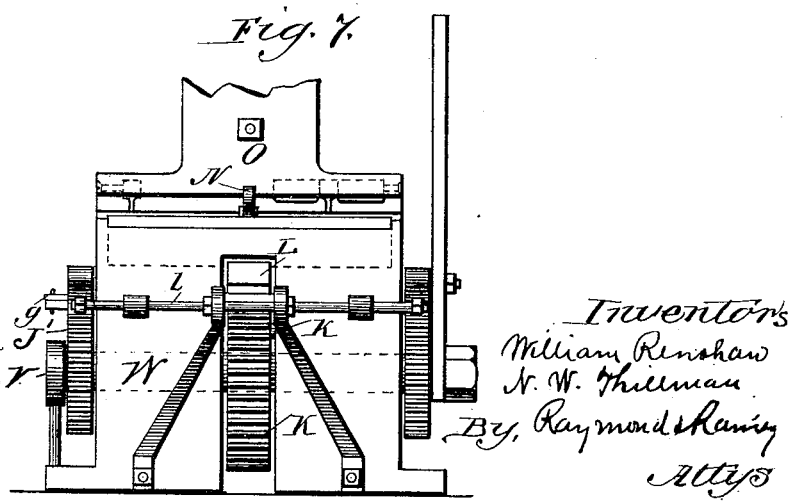

In the drawings, Figure 1 is a side view of the machine. Fig. 2 is a section, and Fig. 3 an end view, of the moving dies and shear-blade. Fig. 4 is a section of a portion of gear C, showing the clutch F. Figs. 5, 6, and 7 are respectively sectional, plan, and end views of the part B, Fig. 1.

The machine is constructed in duplicate, the parts on each side of the line $x\,x$, Fig. 1, being alike. One only of these parts, therefore, is shown.

A, Fig. 1, is the frame of the machine. Secured to it is the casting B, containing the feed-works, stationary shear-blades, and dies. The gear C revolves freely upon the projecting ends of the shafts E E. The gear C is driven by a pulley and pinion on a shaft supported on brackets at the side of A; but for the sake of clearness they are omitted from the drawings. End motion of shaft E is prevented by the collar $e$.

D is a rod sliding through the shaft E. At the inner end of rod D is the clutch F, which is shown in detail in Fig. 4. The clutch F is driven by the gear C, and when the rod D is drawn out engages with its counterpart, the end of the shaft E thus setting the machine in operation. As will be seen on inspection of Fig. 4, the clutch-face is so shaped as to engage only once in a revolution, with the result that the gear and shaft must always have the same relative position. This is rendered necessary by the fact that the feed is operated directly from the gear C, and must take effect while the slide-block O is raised. The slide-block O is constructed as in ordinary power-shears.

The feed mechanism may be understood by referring to Figs. 1, 5, and 6. Passing through B is the shaft W, to which are keyed the ratchet-wheels J J' and the pinion K. Upon one end of the shaft W is wound the spring V, and on the other is pivoted the vibrating arm I, which carries a feed-pawl, $p$, engaging in the ratchet-wheel J. The vibrating arm I receives motion from a projection, $n$, on the hub of gear C, through the rod H and bell-crank lever G, the latter having its upper extremity bent at right angles, so as to project vertically over the axis of the gear C. The ratchet J', with its pawl $f$, serves as a retaining-catch. Extending across B is a second shaft, $l$, to which shaft are attached arm $j$ and fingers $m$ $m$, the latter projecting under the pawls $p$ $f$. A pin, $k$, is inserted near the circumference of the pinion K, so as to come in contact with the arm and raise fingers $m$ $m$, as hereinafter explained. When the fingers $m$ $m$ have been raised by the shaft $l$, they are retained by the catch $g$, which is impelled by the spring $h$. The rack M meshes with the pinion K. It carries the cross-piece M' and grip N.

The arrangement of the moving shear-blade, dies, and punches are clearly shown in Figs. 2 and 3, in which P is the shear-blade, U U are punches, and R R dies. If it is desired to make seals without the impress of the dies R R, the shims are removed and the dies set higher. The lower shear-blade, Y, has a counterpart of the dies R R sunk in its face. Holes Z Z, drilled through blade Y, form dies or matrices for the punches U U. This juxtaposition of the embossing and shearing device is necessary in a self-feeding machine, in order that the succession between the embossing or punching and the shearing may be immediate, without which there must be waste of material.

The operation is as follows: The plate of sheet metal, firmly held by the grip N, is fed forward by successive steps, its advancing edge being successively operated upon by the punches and dies and the shear-blade. When the grip has reached the limit of its forward travel, the pin $k$, Fig. 5, comes in contact with the arm $j$, thereby lifting the fingers $m$ $m$ and disengaging the pawl *f*, and on the backward stroke of the arm I, the pawl *p*. At the same time the catch *g* springs under the fingers *m m*. The shaft W being thus released, reverses its motion under the action of the spring V, and the machine is ready for the insertion of a fresh plate.

It is practicable to operate in this way on a thickness of several plates, greatly increasing the product of the machine.

The construction of the part B of this machine is such that it may be easily adapted to be operated by an ordinary power-shear or a slotter.

We claim—

1. The combination, with a punching or embossing and shearing machine, of an automatic feeding device, consisting of the sliding plate-carrier M N L, and mechanism for driving the latter, with an automatic device, substantially as shown and described, for releasing the feed mechanism when it reaches the limit of its travel.

2. The combination of vibrating arm I, pawl *p*, retaining-pawl *f*, spring V, and pinion K, with the plate-carrier M N L, substantially as and for the purpose set forth.

3. In a plate-feeding device, the combination of pin *k*, arm *j*, shaft *l*, fingers *m m*, and catch *g*, substantially as and for the purpose set forth.

4. In an embossing and shearing apparatus, the combination of shear-blade P, dies R R, and shear-blade Y, having on its edge-face the counter impression of the dies R R.

5. The combination, in an embossing and shearing apparatus having an automatic feeding device, substantially as described, of shear-blade P, dies R R, and shear-blade Y, having through its edge-face the holes Z Z, opposite the punches U U, as and for the purpose set forth.

6. The combination of gear C, shaft E, and rod and clutch D F, the clutch having its face formed as and for the purpose described.

WILLIAM RENSHAW.
NICHOLAS W. THILLMAN.

Witnesses:
W. G. RAINEY,
J. I. VEEDER.